(12) United States Patent
Kelly

(10) Patent No.: US 6,543,202 B1
(45) Date of Patent: Apr. 8, 2003

(54) DEVICE FOR WELDING AND/OR COMBINED CUTTING AND WELDING OF FILMS

(75) Inventor: David Kelly, Obergünzburg (DE)

(73) Assignee: Skinetta Pac-Systeme Kiener GmbH & Co., Ottobeuren (DE)

( * ) Notice: Subject to any disclaimer, the term of this patent is extended or adjusted under 35 U.S.C. 154(b) by 148 days.

(21) Appl. No.: 09/658,987

(22) Filed: Sep. 11, 2000

(30) Foreign Application Priority Data

Sep. 10, 1999 (DE) .......................... 199 43 492

(51) Int. Cl.[7] ................................ B65B 11/06
(52) U.S. Cl. .................... 53/228; 53/373.6; 53/373.7
(58) Field of Search ........................ 53/228, 373.6, 53/373.7, 374.6, 375.8, 554, 167

(56) References Cited

U.S. PATENT DOCUMENTS

| | | | | |
|---|---|---|---|---|
| 2,621,704 A | 12/1952 | Langer | ................ | 154/42 |
| 2,650,183 A | 8/1953 | Langer | ................ | 154/126 |
| 2,796,913 A | 6/1957 | Fener et al. | ................ | 154/42 |
| 2,960,147 A | 11/1960 | Ferrell | ................ | 154/42 |
| 3,015,601 A | 1/1962 | Fener | ................ | 156/515 |
| 3,536,567 A | 10/1970 | Harrison | ................ | 156/498 |
| 3,874,976 A | * 4/1975 | MacFarland | | |
| 3,993,529 A | 11/1976 | Farkas | ................ | 156/380 |
| 4,630,429 A | * 12/1986 | Christine | | |
| 4,761,197 A | * 8/1988 | Christine et al. | | |
| 4,768,326 A | 9/1988 | Kovacs | ................ | 53/373 |
| 4,856,260 A | 8/1989 | Woo et al. | ................ | 53/373 |
| 5,029,430 A | * 7/1991 | Davis | ................ | 53/167 |
| 5,787,690 A | * 8/1998 | Konno | ................ | 53/375.9 |

FOREIGN PATENT DOCUMENTS

| | | |
|---|---|---|
| DE | 2245394 | 9/1972 |
| DE | 2824753 | 12/1979 |
| DE | 3409702 A1 | 10/1984 |
| EP | 0941933 A1 | 9/1999 |
| FR | 13598332 | 3/1963 |
| FR | 2690412 | 10/1993 |

* cited by examiner

Primary Examiner—Eugene Kim
Assistant Examiner—Sameh Tawfik
(74) Attorney, Agent, or Firm—Jacobson Holman PLLC

(57) ABSTRACT

A device for welding or combined cutting and welding comprises a heating element, the heating rail of which is heated and cools down in each work cycle, and an opposed tool which has a rail made of elastic material.

20 Claims, 4 Drawing Sheets

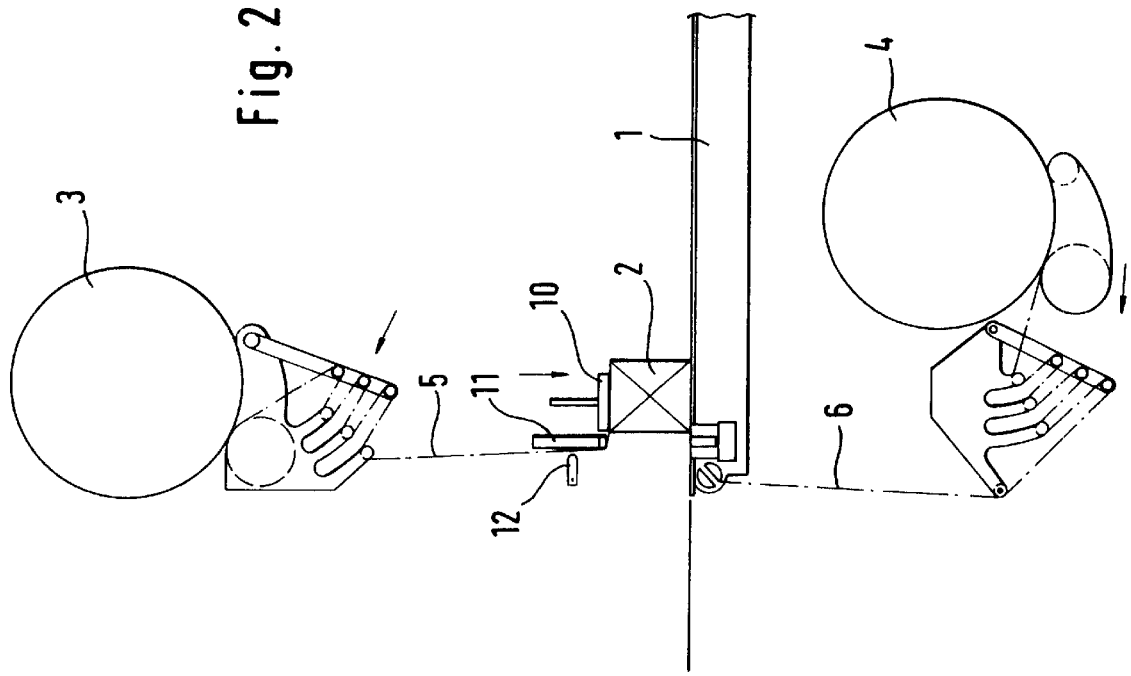
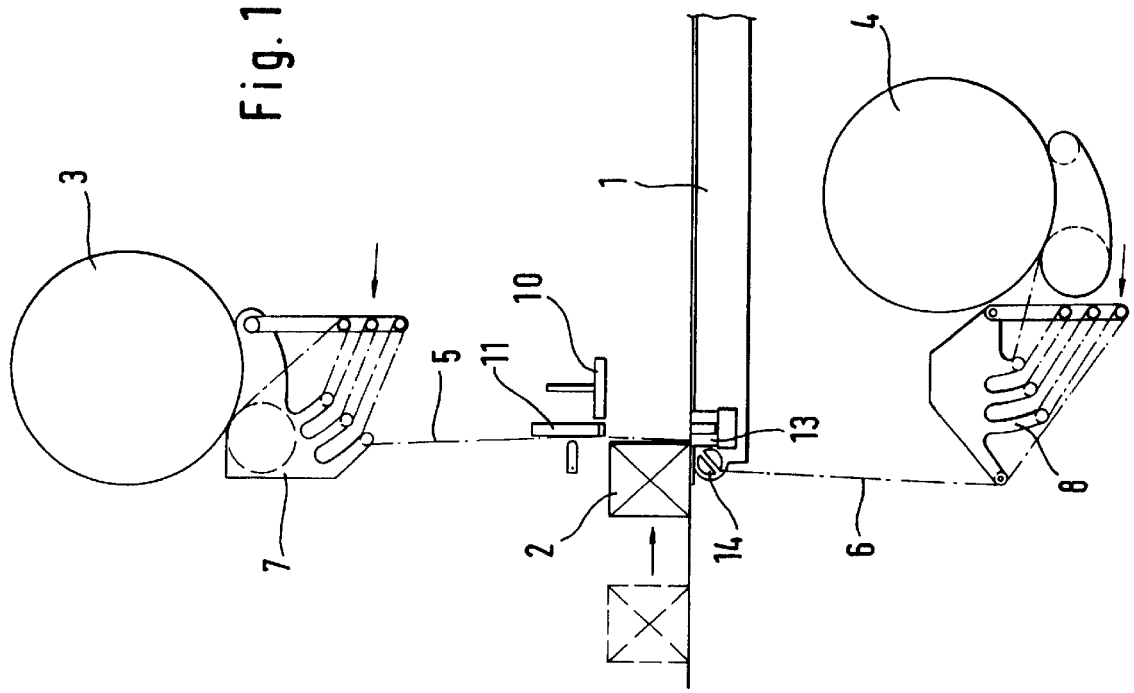

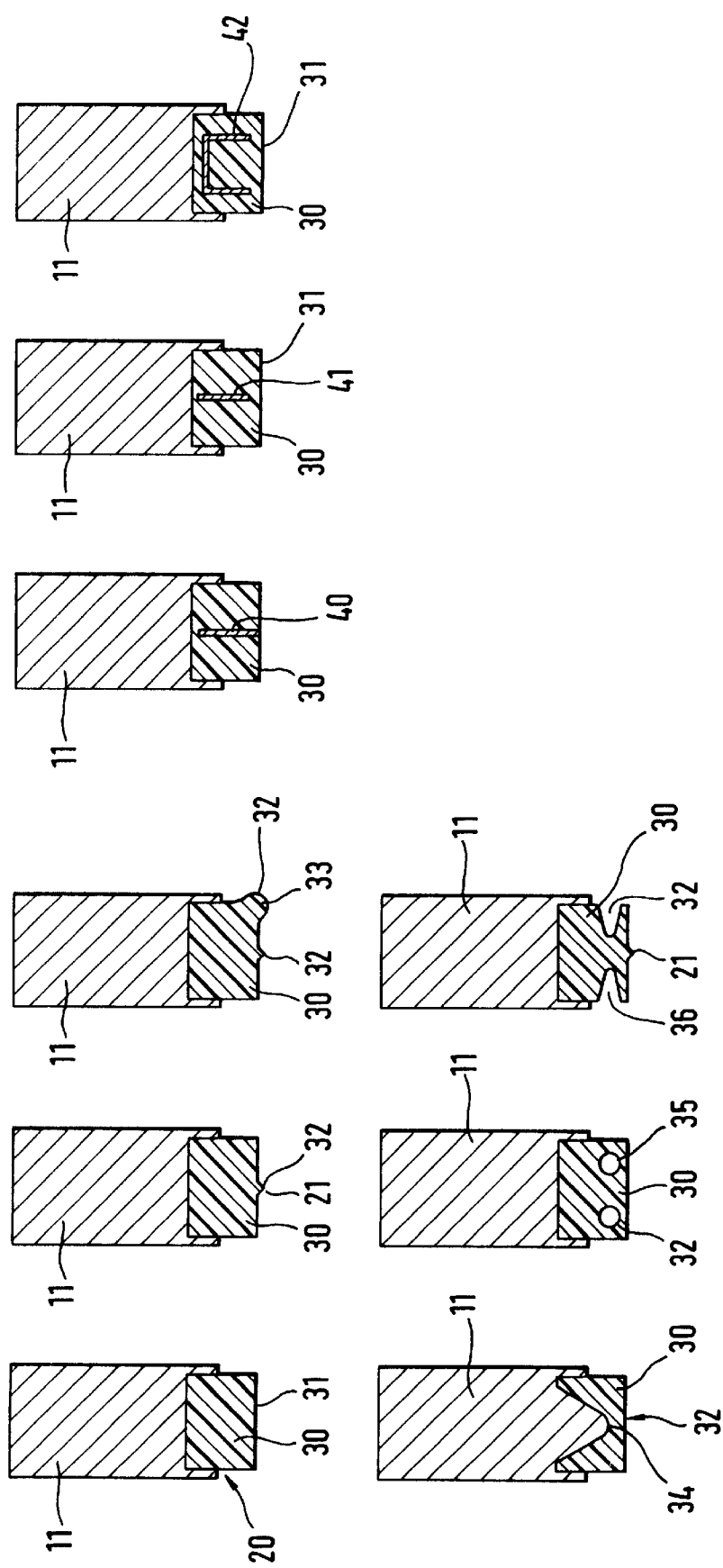

DEVICE FOR WELDING AND/OR COMBINED CUTTING AND WELDING OF FILMS

BACKGROUND OF THE INVENTION

The present invention relates to a device for welding two films, with a heated sealing or welding arrangement cooperating with an opposed tool, the films being arranged between the sealing or welding arrangement and the opposed tool and the sealing or welding arrangement and the opposed tool being movable relative to each other.

Devices of the above-mentioned type are known. The sealing or welding arrangement is usually moved upwardly from below while the opposed tool is moved downwardly from above and, in particular, is integrated into the arrangements which are required for forming loops.

It is pointed out that it is of lesser importance for the device just described, and for the invention, whether the arrangement which joins the ends of the films is formed as a sealing arrangement or as a welding arrangement, so that in this context the one procedure or configuration is entirely interchangeable with the other procedure or configuration.

It is also inessential to the application of the invention whether the device is used for welding two films or two film ends, or both ends of one film, and so on. It is also possible, using the device, to weld together both ends of two areas of the same film, for example, to form a hose or similar part, in order to benefit from the effect according to the invention, and this can apply, for example, to pieces of film as understood in accordance with the invention. It is also possible according to the invention to weld together more than two films or pieces of films.

In the known devices the sealing or welding device comprises a heating blade the upper edge of which has a wedge-like configuration. This heating blade has the function of severing the films as it makes contact with them and at the same time of welding together the film ends produced by the severing action. In this process the film ends forming the loop are firstly to be welded together, so that an endless form is produced. Secondly, the film ends fed from above and below are to be re-connected after separation of the loop, so that a curtain is produced and the work cycle can be repeated. Such devices as those described at the outset are known, for example, in bandolier machines.

For welding of PE films, temperatures of approximately 250° C. are usually necessary. The heating blade or heating mirror is either permanently heated or intermittent heating of these arrangements for short periods is provided, in which case the relatively large mass of the heating blade entails a corresponding thermal inertia. For this reason the sealing process requires a certain time.

In known devices, an interval of about 0.5 sec. is required for sealing, half of this time being needed for heating and the other half for cooling, and in particular for bonding the film ends.

For example, if a bandolier machine of the type in question executes 35 work cycles per minute, a time of 1.71 sec. is available for one work cycle. The time interval required for the complete welding process therefore accounts for about one-third of the total time.

Furthermore, the heating blade used in such machines is a source of danger or injury, as it is usually heated to a temperature of more than 200° C.

In the known machine the heating blade, as already described, is moved upwardly from below during the work process. In the upper part of the movement the blade acts on the films. The not inconsiderable mass of the heating blade and the associated arrangements requires a sufficiently powerful drive system to which the corresponding machine parts must be adapted. In addition, means for aligning or fixing the films one above the other are necessary in the known machines. For this purpose suitable tensioning elements or clamping devices are used, the operation of which must be incorporated in the periodically-occurring welding procedure, which operation, of course, takes time. Furthermore, the use of these additional elements is correspondingly expensive and also requires additional space, which is difficult to provide, especially because the welded seam, for example, on a ready-packed product, must be arranged as close as possible to the product.

BRIEF SUMMARY OF THE INVENTION

It is an object of the present invention to provide an improved device for welding films/pieces of film of the type described above in which the above disadvantages are reduced or substantially obviated. It is a further object to provide a device in which that a higher cycle frequency is achieved.

The present invention provides a device for welding two films or pieces of film, with a heated sealing or welding arrangement cooperating with an opposed tool, the films being arranged between said sealing or welding arrangement and said opposed tool and said sealing or welding arrangement and said opposed tool being movable relative to each other, wherein said opposed tool has elastic material on its front face facing towards said film and/or said front face of said opposed tool facing towards said film is of elastic configuration, and in that said elastic material and/or said front face yields elastically at least partially when said sealing or welding arrangement and said opposed tool are moved together.

In the device according to the invention, when said opposed tool necessary to the welding process is advanced, said films are also fixed in place, one upon the other, by the same movement, either simultaneously or before or afterwards. By combining two operations of fixing the films and advancing said opposed tool for the welding process, time is saved in the periodic welding process and it is possible, in principle, to operate the device at higher cycle frequencies.

According to the invention the device is used for welding, that is, for joining two pieces of film without having to destroy said film. In a preferred embodiment of the invention combined cutting and welding, that is, a process in which the film is severed, is also possible.

In order to join the films, the opposed tool and the sealing or welding arrangement are movable relative to each other. Through the elastic configuration of the face of the opposed tool facing the film, it is ensured that, regardless of the exact thickness of the films or the relative position of the sealing or welding arrangement in relation to the opposed tool, sufficient pressure or force is always exerted on the film so that the desired function, for example, welding or combined cutting and welding, is achieved. In the prior art, complex adjustment of the precise final positions of the moving parts in relation to each other was necessary in order to avoid, in particular, shearing of the films by the moving parts without cutting and welding being achieved. Conversely, adjustment was also necessary to ensure that no gap was left between the opposed tool and the sealing arrangement, which gap would make it impossible to join the films. The design advantage as described above also makes possible a further advantage, in that the complex adjustment processes otherwise needed, especially when changing films or carrying out maintenance work, can be omitted.

In a preferred embodiment of the device according to the invention said opposed tool includes means by which the degree of elasticity of said opposed tool and/or of said front face is varied and, in particular, is reduced, so that this zone exerts increased pressure on said film when said sealing or welding arrangement and said opposed tool are brought together. The bringing together of said sealing or welding arrangement and said opposed tool causes said material to yield towards said opposed tool, because of its elasticity. As a result of this springing effect, an essentially predetermined force is produced between said opposed tool and said sealing or welding arrangement. In the further development according to the invention this force is varied locally in order to achieve special effects, for example, by applying increased pressure to certain portions in order to provide better thermal contact or to exert corresponding shear forces on said film in order, for example, to sever said film more easily or quickly. However, increased elasticity can also result, and reduced pressure can be provided, for example, in order to prevent contact between or sealing of said films despite said heated tool face. The effect described above is used in particular, however, to provide zones which not only weld but serve for cutting and welding. As means for changing the elasticity of said elastic material, inserts, beads, additional layers or weakened areas of said elastic material may be utilised.

In a preferred embodiment of a device according to the invention said opposed tool is formed as a rail and the means for varying the elasticity of said elastic material are arranged along said rail. The rail-like opposed tool is aligned, in the feed direction, transversely to the film strip and, if appropriate, is movable at right angles to it. The sealing or welding arrangement cooperating with the opposed tool is correspondingly positioned and, if appropriate, is also movable or stationary in relation to it.

In the invention the welding and/or severing of the film ends is essentially achieved by an appropriate configuration of said opposed tool. In particular, said sealing or welding arrangement is arranged without a drive mechanism, only said opposed tool being advanced towards said sealing or welding arrangement.

Considerable advantages are obtained through the invention. In addition to the fact that said sealing or welding arrangement is no longer moved but is fixed in place, so that its drive system is omitted, owing to the fact that said rail consists of elastic material, the different necessary work processes can logically be carried out successively or simultaneously, or in a manner whereby the different work processes overlap in time, without impairing the final result. For example, combined cutting and welding can take place when said films are just being clamped. As a result, the process cycle can be accelerated.

The silicone rubber used for example in the device according to the invention as said elastic material, can function up to the required temperatures of approximately 300° C. and also has sufficient durability. In particular, it is sufficiently elastic, so that the result sought is achieved merely by moving said opposed tool against said sealing or welding arrangement.

The invention preferably makes use of a sealing or welding arrangement which is so configured that it is brought to the required welding or cutting temperature in a short time but then cools sufficiently quickly for said sealing or weld seams to be stable. Said heating rail itself is located at the centre of said sealing or welding arrangement and is wide enough to cooperate with said cutting and welding portions of said opposed tool.

In a preferred embodiment of the device according to the invention, said heating rail is surrounded by several layers of ceramic and/or plastic material, so that a relatively small thermal mass is obtained. This sharply reduces the thermal inertia of the system.

In the arrangement according to the invention an interval of only up to 0.4 sec. is required for heating. A current pulse of 0.05 to 0.15 sec. is preferably used to heat said heating rail to working temperature. Said heating rail cools in approximately the same interval. The sharp reduction in the time required for sealing allows the machine to achieve a substantially higher number of cycles per minute. To realise these fast heating and cooling times, special configurations of the sealing or welding unit are proposed according to the invention.

In a further embodiment of the device according to the invention the contours of the operating faces of said opposed tool and of said sealing or welding arrangement are so adapted to each other that the zone for clamping projects beyond the others so that this zone becomes effective before the others.

In this preferred embodiment of the device according to the invention said opposed tool presses said two superimposed films against said sealing or welding arrangement. Because of the projection of the clamping zones, clamping and thus fixing of said films is achieved. In particular, at the moment of fixing said film by said clamping zones, there is practically no contact between said cutting zone and said heating arrangement. But as said opposed tool is in motion, contact between said cutting zone of said opposed tool and said two superimposed films, which are thereby pressed against said heating arrangement, occurs immediately after the clamping process.

For this purpose said rail of elastic silicone rubber or similar material has a projecting rib at right angles to the feed direction of said films, which rib presses said films against said heated sealing or welding arrangement. This rib acts as a means for changing the elasticity of said elastic element. It is not necessary for said sealing or welding arrangement to be wedge-shaped, as it was described at the outset with reference to the prior art. Said sealing or welding arrangement can, for example, be flat in this area.

Said projecting rib on said silicone rubber rail is preferably wedge-shaped in cross-section, so that the welding and cutting of said films occurs in a relatively small zone. The required heat which must act on said films thus remains low.

According to a further feature of the device according to the invention substantially flat faces are arranged on either side of said rib and form the zone for welding or sealing. In the feed process, therefore, after the severing of said two films, said films are pressed against said heating rail. The two processes occur close together in time, overlapping or simultaneously, as determined by the feed rate of said opposed tool and the elasticity of said silicone rubber rail.

The short heating phase of said heating rail already passes into a cooling phase at this stage of the process, as the temperature for sealing is somewhat lower than the temperature for cutting. It is favourable in this regard that said heating rail has low thermal inertia, that is, said heating conductor is relatively narrow and of low mass so that not too much material is heated. It is also favourable it a cooling arrangement, in particular a water cooling system, by which the reduction of temperature after sealing can be further accelerated, is provided for said heating rail.

The welding and sealing zones on said silicone rubber rail running along either side of said cutting projection are preferably substantially flat.

Outside the zones for welding and sealing projecting beads are preferably provided to clamp said films during the interaction with said sealing or welding arrangement.

Said sealing or welding arrangement preferably has recesses cooperating with said clamping zones on said opposed tool. In particular, these recesses which cooperate with said beads are only partly matched to these beads. This causes deformation of said beads and an improved clamping effect. Obstructions by very small foreign bodies cannot have a detrimental effect.

Alternatively to providing said opposed tool with means for altering the elasticity of said elastic material, for example, a rib or a wedge, it is also possible to give said face of said opposed tool a flat or spherical form, for example, as part of a cylinder jacket face or suchlike configuration. In particular, the smooth, flat form also produces the effect, in accordance with the invention, that, for example, welding or combined cutting and welding is achieved by appropriate triggering of said heating rail. However, the use of a means of changing the elasticity, such as an insert, rib or similar means, as described later, increases the mechanical pressure in this zone and under some circumstances resulting in faster processing as well as helping to increase the cycle rate.

In the device according to the invention, said opposed tool comprises elastic material for example, for said rail. Elastomers, caoutchouc, rubber or silicone rubber or similar materials are preferably used for this purpose. By the term "Elastomers" are meant polymers with rubber-elastic behaviour, which are repeatedly stretched at room temperature and after storage return to approximately their initial length. No particular elastomer is exclusively suitable for use in the device according to the invention; all known elastomers in this branch of technology, for example, rubber based on polyester urethane, ethylene acrylate, ethylene-propylene copolymers and so on, can be used. The favourable thermal properties of silicone rubber (e.g. FVMQ—fluosilicone rubber) have already been mentioned. It is also possible, however, in addition to synthetically produced materials, to use natural products such as caoutchouc or rubber which, if necessary, are shielded with a heat-resistant material and produce elastic bedding. Plastics with different chemical compositions, which are sufficiently elastic and can withstand the temperatures applied, can also be used.

The portions of said rail used for clamping are so formed and arranged, in relation to said other portions used for welding or sealing, that they project by about 0.2 mm to 1.5 mm beyond said portions used for welding or sealing.

A similar relationship can be achieved if, in the zone of said heating arrangement, for example, a corresponding profile is provided to ensure that when said opposed tool is advanced the clamping process occurs sufficiently ahead of the moment of welding of sealing. Said rail used for cutting can be formed and arranged in an analogous way.

The zone of said rail used for cutting is so arranged in a preferred embodiment that it projects by about 0.4 mm to 1.3 mm beyond the zones for welding or sealing.

The invention can be varied in different ways; for example, it is not absolutely necessary that the surfaces of the zones on said rail also consist of silicone rubber. It is possible to form these zones entirely or partially from layers consisting of a different material, for example metal. These layers are mounted elastically and resiliently on said rail, for example, through being supported on springs or similar means.

It is recommended that said opposed tool is formed so that said rail made of elastic, silicone rubber or similar material is mounted interchangeably on a carrier. With such a configuration it is possible to exchange said elastic material simply, if it is worn or damaged.

The invention relates not only to the device as described above but extends likewise to include a bandolier machine in which a feed arrangement advances the merchandise to be wrapped against a film curtain which forms a loop around said merchandise, and in which a device as described above is used, and said heated sealing or welding arrangement which cooperates with an opposed tool severs said loop formed behind said merchandise from said film curtain and joins said film ends of said loop and of said curtain.

With such a machine the cutting or combined cutting and welding and the welding are carried out substantially simultaneously. For this it is preferred that said opposed tool be formed by a profiled rail with elastic silicone rubber as said elastic material, said front face of which, facing said film, is either substantially flat or has zones for clamping or for welding or severing.

An embodiment of a bandolier machine will now be described with reference to the accompanying drawings, in which:

FIGS. 1 to 4 are a schematic illustration of the essential parts of a bandolier machine according to the invention in different positions during a work cycle;

FIG. 5 shows an enlarged view of a detail of the device according to the invention and FIGS. 6a to 6i show side views of a detail of the opposed tool of the device according to the invention.

Figure 4:
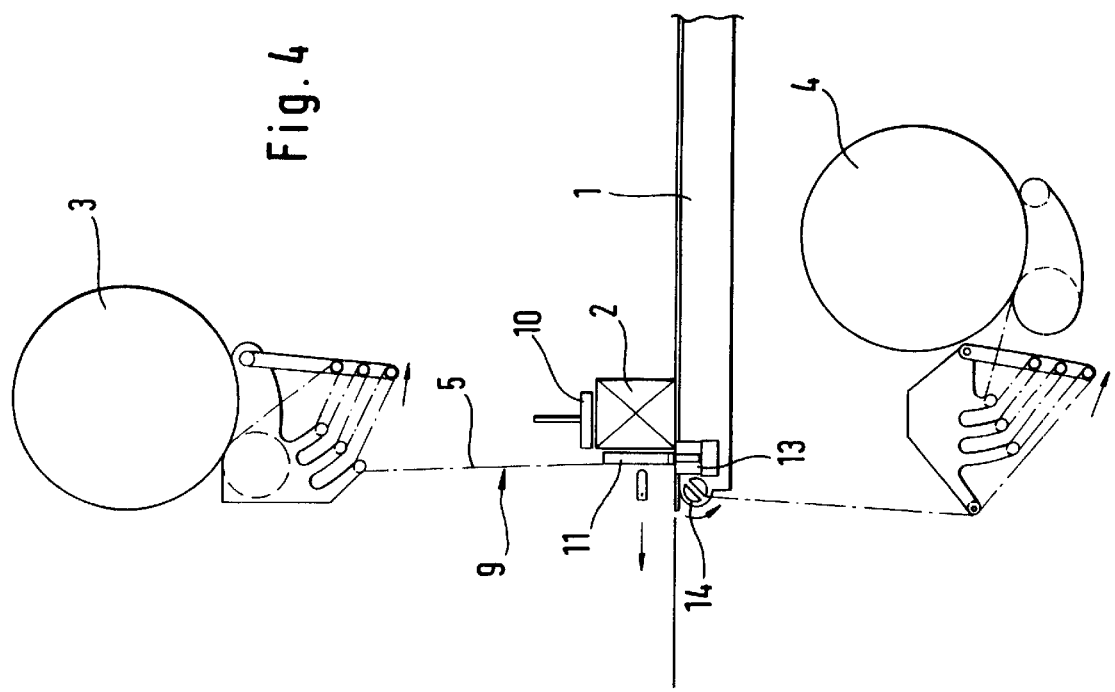

The bandolier machine shown in FIGS. 1 to 4 comprises essentially a table 1 on which the merchandise 2 to be packed is moved. The films 5 and 6 run in one case from the upper roll 3 and in the other from the lower roll 4, films 5, 6 first being guided over magazine arrangements 7, 8 to adapt the film feed to the requirements of a bandolier. Films 5 and 6 are to be welded together in proximity to the merchandise 2 to be packaged so that a curtain 9 is produced against which the merchandise 2 is pushed. This is shown in FIG. 1.

Figure 3:
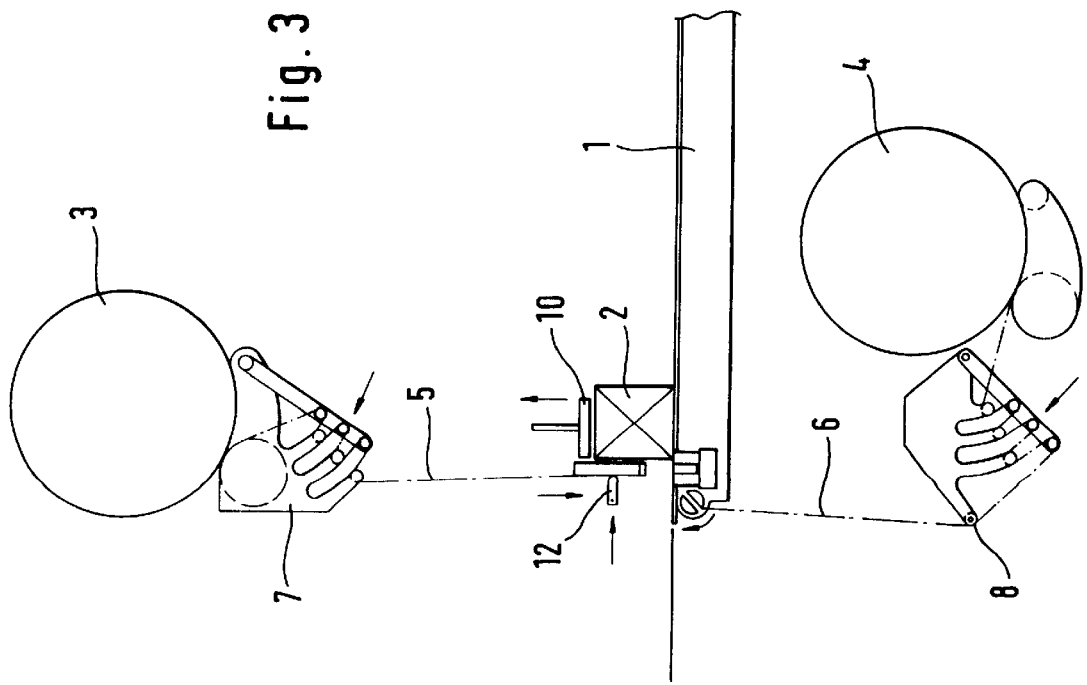

After advancing of the merchandise the position shown in FIG. 2 results. The merchandise 2 is enclosed by the film on three sides. A stamp-like holder 10 holds the merchandise and the film 5 securely. The opposed tool 11, which also cooperates in the movement of the film 5, is moved downwardly from above, as indicated in FIG. 3. To allow this, the holder 10 can, for example, be briefly raised while the clamp 12 cooperates with the opposed tool 11 to tension the loop around the merchandise 2. The opposed tool 11 moves against the sealing or welding arrangement 13 arranged or recessed in the table 1, until the position shown in FIG. 4 is reached. Clamp 12 releases the film 5 while the clamping arrangement 14, formed by a rotatable roller, exerts a tensioning effect.

Figure 5:
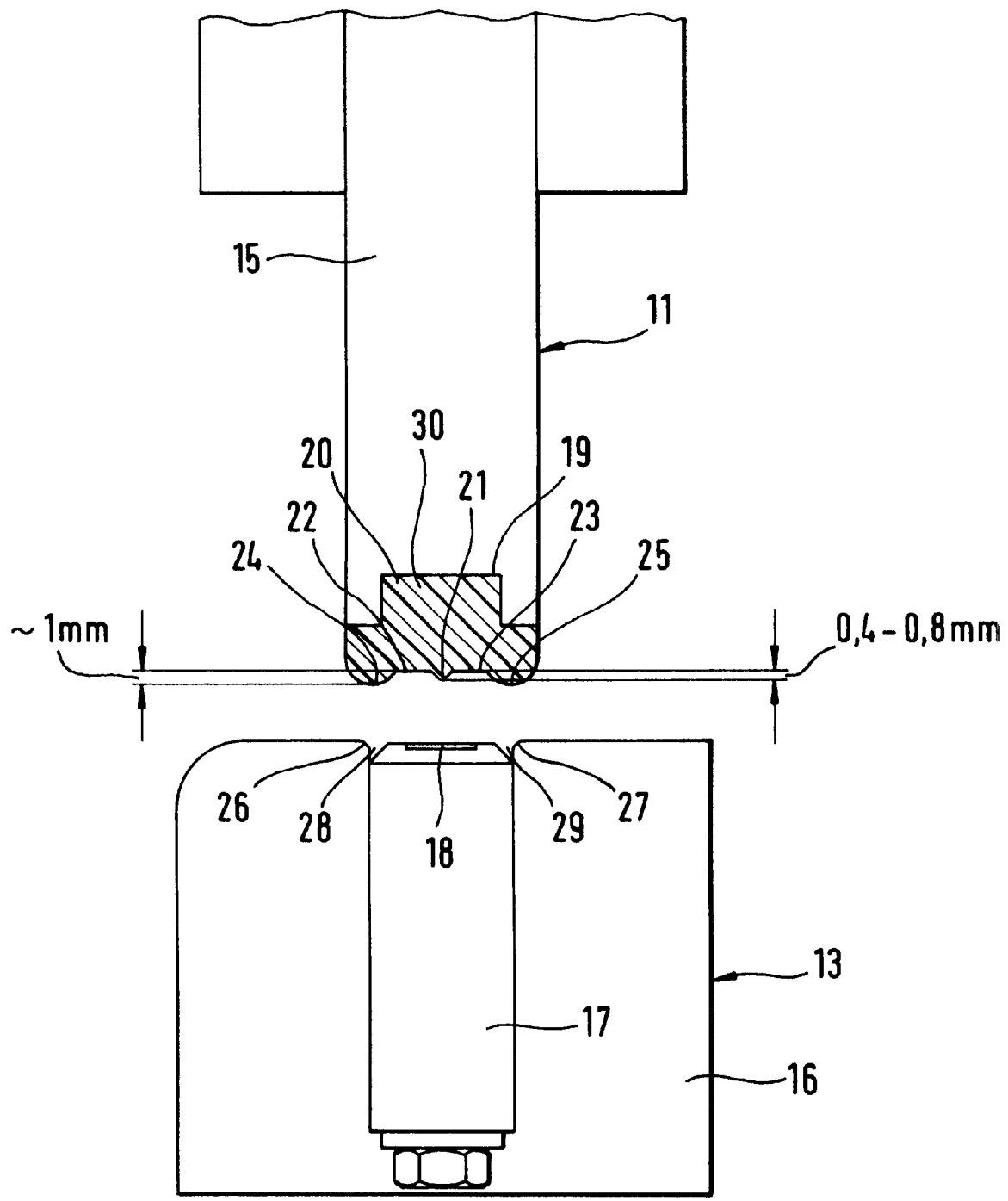

FIG. 5 shows the opposed tool 11 and the sealing or welding arrangement 13. The sealing or welding arrangement 13 comprises essentially a holder 16 for the heating element 17 attached to the table 1, the details of which heating element are not shown. Only the heatable rail 18 is shown, which rail is briefly heated for each welding process and then cooled again.

The carrier 15 of the opposed tool 11 supports the rail 20 made of elastic material 30 in a recess 19, which rail extends transversely over the whole width of films 5, 6 or of the film curtain 9.

On the front or lower face of rail 20 essentially five zones are provided, comprising a central wedge-like rib 21 beside which the two zones 22 and 23 extend, which zones are flat and are used for sealing the ends of the film strips. Zones 22 and 23 are bordered by the beads 24 and 25. Beads 24 and 25 project about 1 mm beyond zones 22 and 23, while the height of rib 21 is about 0.8 mm in relation to zones 22 and 23. These dimensions can be varied within limits. In FIG. 5 the films are not shown in detail.

When the opposed tool 11 moves downwardly the beads 24 and 25 first come into contact with the edges 26 and 27 of holder 16 and clamp the superimposed films. Beads 24 and 25 can partially engage in the recesses 28 and 29. Because the beads deform, the rib 21 presses the two superimposed films which have unreeled from the rollers 3 and 4 against the heating rail 18. Because of the heat of the heating rail 18 the films are severed. Directly in connection with this, with a short time difference or simultaneously, the films are pressed by zones 22 and 23 against the outer zones of heating rail 18 which are somewhat cooler, so that the superimposed films are sealed or welded together. As the cooling process begins immediately, because of the low thermal inertia, the opposed tool 11 can be quickly withdrawn. The merchandise 2, now enclosed by the loop, can be further advanced and the work cycle can be continued by the welding together of films 5 and 6 in zone 22 to form the curtain 9.

Alternatively to the configuration shown in FIG. 5 it is also possible for the edges 26, 27 and the recesses 28, 29 in the sealing or welding arrangement 13 to be omitted. The cooperating faces of the opposed tool 11 and the sealing or welding arrangement 13 are then substantially flat, if not even parallel. They can also be aligned to each other as matching spherical and negatively spherical forms, whereby an additional tensioning effect can be produced when moving these elements together.

It can be seen in FIG. 5 that the sealing or welding arrangement 13 includes a heating rail the thickness of which, seen in cross section, is low in relation to its width. A thermal inertia as low as possible is thereby achieved, since, the mass of the material to be heated is kept small. Heating rail 18 consists, for example, of only a thin metal sheet or similar element mounted on the heating element 17. It is attached to its heating element 17 by a bonding material, for example. It is also possible, however, to apply the heating rail 18 to the top surface of the heating element 17 by using vaporization.

It is also seen in FIG. 5 that, seen in cross section, the width of heating rail 18 is less than the effective width of the elastic material 30 or the elastically yielding front face of the opposed tool. As a result a margin remains to the left and right of the heating rail 18, which margin cooperates with the corresponding zones of beads 24, 25, as shown in FIG. 5, to produce a clamping of the film. As already mentioned, however, the use of these beads 24, 25 is not essential at this point.

FIGS. 6a to 6l, different configurations of the opposed tool 11 are shown. The variants shown between FIGS. 6a and 6i differ with regard to the configuration of the elastic material 30. The embodiments are shown in cross section. In the configuration shown in FIG. 6a the effect according to the invention is produced by a substantially flat front face 31 of elastic material 30. Such a configuration is advantageous, for example, if only a welding action and not a combined cutting and welding action is to be carried out.

If combined cutting and welding is to be carried out a rib 21, as in FIG. 6b, for example, is provided at the centre, which rib is already used as a means 32 for changing the elasticity of elastic material 30.

In FIG. 6c a further means 32 is shown. In addition to the centrally arranged rib a rail-like bead or shoulder 33, for example, is provided at the side, projecting downwardly from the front face.

In FIG. 6d the means 32 is obtained by the reduced thickness 34 of the elastic material. Seen in cross section the opposed tool 11 has here a wedge-shaped profile which tapers to a small thickness 34 at its end, thus reducing the elasticity and increasing the rigidity at this point.

In FIG. 6e means 32 is obtained by two tubular internal cavities 35 which contribute to increasing the elasticity in these areas. As a result, in such a configuration, a greater force will be transmitted by the middle portion arranged between the two cavities 35. The case is similar in the configuration according to FIG. 6f, in which a lateral undercut portion 36 is provided as means 32, a point or rib 21 being additionally provided. However, means 32 is also realisable without this rib 21.

In FIG. 6g, 6h and 6i inserts 40, 41, 42 are provided in the elastic material 30. These inserts are, for example, metal, plastic or wooden profiles with relatively low elasticity, in order to achieve the effect described. If a force is exerted on this opposed tool the surface in proximity to the insert will be unable to yield so far, as elasticity is lacking in this area. The force transmitted or the prevailing pressure in this zone will be greater than in adjacent, unimpeded zones.

The embodiment according to FIG. 6g shows a rail-like profile-section insert 40, the lower end of which is arranged close to the front face 31, almost completely penetrating the thickness of the material 30. There is only a small zone where elastic material pads the back of insert 40, thus providing a certain elasticity.

According to the embodiment shown in FIG. 6h the insert 41, also formed as a rail, is enclosed by elastic material 30 at both the back and the front, relative to the front face 31.

According to the embodiment shown in FIG. 6i a U-shaped profile-section insert 42 is provided, which divides the front face 31 into a total of five different sectors with elasticity. Two of these zones, namely those arranged below the ribs, are zones with lower elasticity, while the zones beside and between them have higher elasticity.

The use of inserts 40, 41, 42 is not restricted to the profile forms shown here; any desire profile section can be used.

The claims now submitted with the application and later are attempted formulations without prejudice to the obtaining of further protection.

The references to the main claim in the dependent claims refer to the further development of the subject of the main claim by the features of the subordinate claims concerned. However, these references should not be understood to imply a renunciation of the right to obtain independent protection of the features of the subordinate claims containing these references.

Features which hitherto have been disclosed only in the description may take on significance essential to the invention in the course of prosecution, for example, in distinguishing the invention from the prior art.

What is claimed is:

1. Device for welding two films, said device comprising:
   a welding arrangement co-operating with an opposed tool, said two films being arranged between said welding arrangement and said opposed tool and said welding arrangement and said opposed tool being movable relative to each other, a front face of said opposed tool includes elastic material, and said elastic material yields elastically at least partially when said welding arrangement and said opposed tool are moved together, a degree of elasticity of a zone of said elastic material of said opposed tool being reduced so that said zone exerts an increased pressure on said two films as compared to a remainder of said elastic material when said welding arrangement and said opposed tool are moved together.

2. Device according to claim 1, wherein said opposed tool is a rail and the zone of reduced elasticity is arranged on said rail.

3. Device according to claim 2, wherein said welding arrangement has a holder which supports a heating rail and a thickness of said heating rail in cross section is small in relation to its width and a cooling system for said heating rail is provided on said holder.

4. Device according to claim 3, wherein said heating rail has low thermal inertia and is heated to working temperature by a current pulse of up to 0.4 sec.

5. Device according to claim 3, wherein, seen in cross section, the width of said heating rail is less than an effective width of said elastic material.

6. Device according to claim 3, wherein said opposed tool clamps said two films to be welded next to said heating rail while said heating rail is being supplied with heating current.

7. Device according to claim 2, wherein the elastic material is mounted elastically and resiliently.

8. Device according to claim 1, wherein the the remainder of said elastic material includes one of a recess, a lateral undercut, an internal tubular cavity and an internal rail.

9. Device according to claim 1, wherein said welding arrangement is adapted to the shape of said opposed tool.

10. Device according to claim 1, wherein said opposed tool is used for one of welding and combined cutting and welding in the zone with reduced elasticity.

11. Device according to claim 1, wherein said elastic material is made from one of an elastomer, caoutchouc, rubber and silicone rubber.

12. Device according to claim 1, wherein said remainder of said elastic material has substantially flat faces for welding the two films.

13. Device according to claim 12, wherein, on either side of the substantially flat faces used for welding said two films, projecting beads which clamp said films in cooperation with said sealing arrangement are provided.

14. Device according to claim 13, wherein the projecting beads for clamping project in relation to the substantially flat faces so that the projecting beads are effective before the substantially flat faces.

15. Device according to claim 13, wherein the projecting beads used for clamping project in relation to the substantially flat faces used for welding by 0.2 mm to 1.5 mm, and the zone used for severing projects by about 0.4 mm to 1.3 mm in relation to the substantially flat faces for welding.

16. Device according to claim 1, wherein only said opposed tool is advanced against said welding arrangement.

17. Device according to claim 1, wherein the zone of said opposed tool comes into contact with said welding arrangement first and severs said two films.

18. Device according to claim 1, wherein said elastic material is mounted interchangeably on a carrier.

19. Device according to claim 1, wherein said welding arrangement has recesses which co-operate with zones for clamping on said opposed tool.

20. Bandolier machine with the device according to claim 1, wherein a feed arrangement pushes merchandise to be wrapped against a film curtain which forms a loop around the merchandise, with the welding arrangement which co-operates with the opposed tool to sever the loop behind the merchandise from said film curtain and joins the film ends of the loop and of said curtain.

* * * * *